US012558616B2

(12) United States Patent
Gainey et al.

(10) Patent No.: US 12,558,616 B2
(45) Date of Patent: Feb. 24, 2026

(54) INDICATING USER INPUT TIMINGS ASSOCIATING WITH GAMING

(71) Applicant: QUALCOMM Incorporated, San Diego, CA (US)

(72) Inventors: Kenneth Marvin Gainey, Escondido, CA (US); Ahmed Ragab Elsherif, San Jose, CA (US); Raja Banerjea, Saratoga, CA (US); Rong He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/321,690

(22) Filed: May 22, 2023

(65) Prior Publication Data

US 2024/0390782 A1     Nov. 28, 2024

(51) Int. Cl.
*A63F 13/235*     (2014.01)
*A63F 13/327*     (2014.01)
*A63F 13/44*     (2014.01)
*H04W 56/00*     (2009.01)

(52) U.S. Cl.
CPC .......... *A63F 13/235* (2014.09); *A63F 13/327* (2014.09); *A63F 13/44* (2014.09); *H04W 56/0015* (2013.01)

(58) Field of Classification Search
None
See application file for complete search history.

(56) References Cited

U.S. PATENT DOCUMENTS

2008/0123582 A1*  5/2008  Maekawa ............. H04W 88/10
                                                        370/315
2013/0260899 A1*  10/2013  Nemoto ................ A63F 13/822
                                                        463/42
2014/0328313 A1   11/2014  Merlin et al.
2024/0215066 A1   6/2024   Yang et al.

FOREIGN PATENT DOCUMENTS

WO          2021234582 A1    11/2021
WO          2023284648 A1    1/2023

OTHER PUBLICATIONS

International Search Report and Written Opinion—PCT/US2024/028175—ISA/EPO—Sep. 19, 2024.

* cited by examiner

*Primary Examiner* — Damon J Pierce
(74) *Attorney, Agent, or Firm* — Harrity & Harrity, LLP

(57) ABSTRACT
Various aspects of the present disclosure generally relate to wireless communication. In some aspects, a wireless communication device may receive a first beacon signal associated with a wireless access point associated with a gaming console, the first beacon signal indicating a first reference time value. The wireless communication device may obtain, associated with a first input time, a first indication of a first user input to a user input device, wherein the wireless communication device is associated with the user input device. The wireless communication device may transmit a first communication comprising first user input data, associated with the first indication, and a first input timing value indicating the first input time relative to the first reference time value. Numerous other aspects are described.

30 Claims, 11 Drawing Sheets

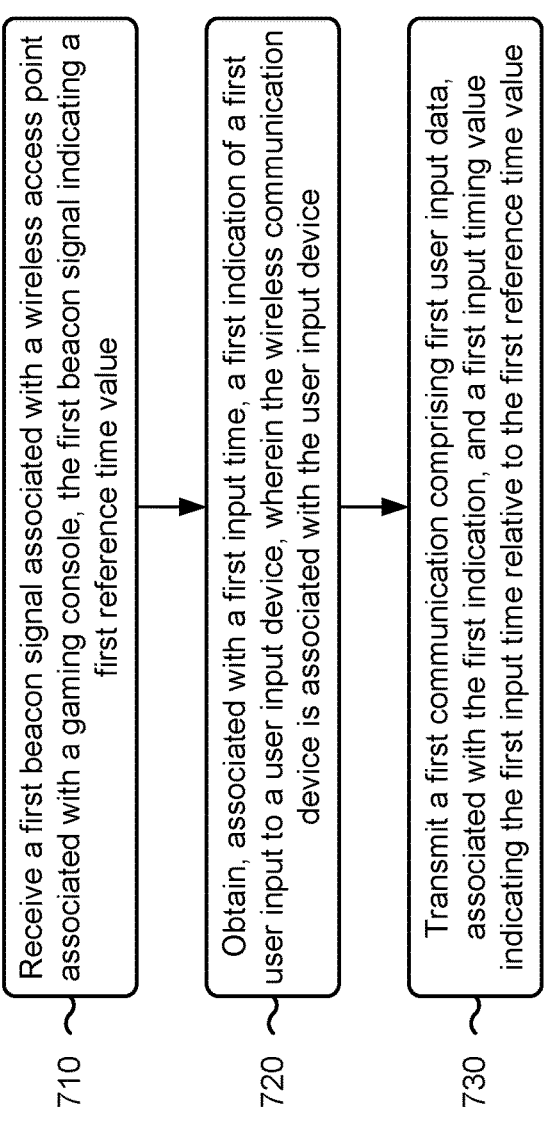

700

710 Receive a first beacon signal associated with a wireless access point associated with a gaming console, the first beacon signal indicating a first reference time value 720 Obtain, associated with a first input time, a first indication of a first user input to a user input device, wherein the wireless communication device is associated with the user input device 730 Transmit a first communication comprising first user input data, associated with the first indication, and a first input timing value indicating the first input time relative to the first reference time value

FIG. 7

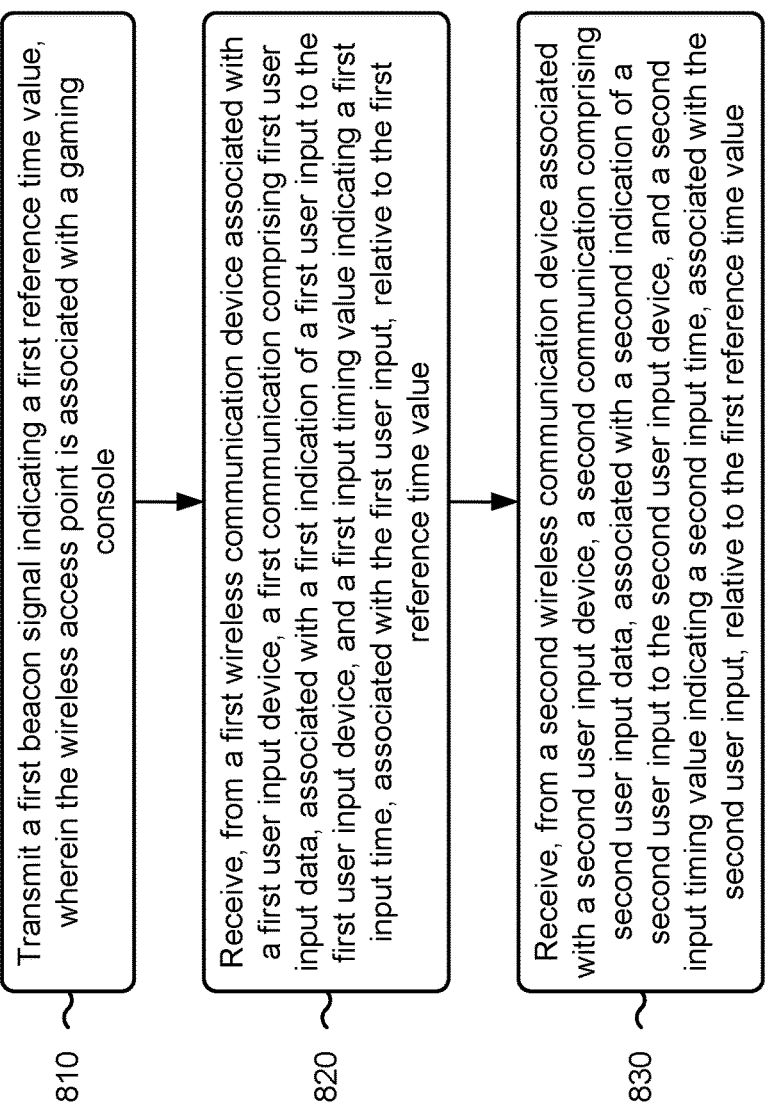

810 — Transmit a first beacon signal indicating a first reference time value, wherein the wireless access point is associated with a gaming console 820 — Receive, from a first wireless communication device associated with a first user input device, a first communication comprising first user input data, associated with a first indication of a first user input to the first user input device, and a first input timing value indicating a first input time, associated with the first user input, relative to the first reference time value 830 — Receive, from a second wireless communication device associated with a second user input device, a second communication comprising second user input data, associated with a second indication of a second user input to the second user input device, and a second input timing value indicating a second input time, associated with the second user input, relative to the first reference time value

INDICATING USER INPUT TIMINGS ASSOCIATING WITH GAMING

FIELD OF THE DISCLOSURE

Aspects of the present disclosure generally relate to wireless communication and to techniques and apparatuses associated with indicating user input timings associated with gaming.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

A WLAN may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

Some aspects described herein relate to a wireless communication device for wireless communication. The wireless communication device may include one or more memories and one or more processors coupled to the one or more memories. The one or more processors may be configured to receive a first beacon signal associated with a wireless access point associated with a gaming console, the first beacon signal indicating a first reference time value. The one or more processors may be configured to obtain, associated with a first input time, a first indication of a first user input to a user input device, wherein the wireless communication device is associated with the user input device. The one or more processors may be configured to transmit a first communication comprising first user input data, associated with the first indication, and a first input timing value indicating the first input time relative to the first reference time value.

Some aspects described herein relate to a wireless access point for wireless communication. The wireless access point may include one or more memories and one or more processors coupled to the one or more memories. The one or more processors may be configured to transmit a first beacon signal indicating a first reference time value, wherein the wireless access point is associated with a gaming console. The one or more processors may be configured to receive, from a first wireless communication device associated with a first user input device, a first communication comprising first user input data, associated with a first indication of a first user input to the first user input device, and a first input timing value indicating a first input time, associated with the first user input, relative to the first reference time value. The one or more processors may be configured to receive, from a second wireless communication device associated with a second user input device, a second communication comprising second user input data, associated with a second indication of a second user input to the second user input device, and a second input timing value indicating a second input time, associated with the second user input, relative to the first reference time value.

Some aspects described herein relate to a method for wireless communication performable at a wireless communication device. The method may include receiving a first beacon signal associated with a wireless access point associated with a gaming console, the first beacon signal indicating a first reference time value. The method may include obtaining, associated with a first input time, a first indication of a first user input to a user input device, wherein the wireless communication device is associated with the user input device. The method may include transmitting a first communication comprising first user input data, associated with the first indication, and a first input timing value indicating the first input time relative to the first reference time value.

Some aspects described herein relate to a method for wireless communication performable at a wireless access point. The method may include transmitting a first beacon signal indicating a first reference time value, wherein the wireless access point is associated with a gaming console. The method may include receiving, from a first wireless communication device associated with a first user input device, a first communication comprising first user input data, associated with a first indication of a first user input to the first user input device, and a first input timing value indicating a first input time, associated with the first user input, relative to the first reference time value. The method may include receiving, from a second wireless communication device associated with a second user input device, a second communication comprising second user input data, associated with a second indication of a second user input to the second user input device, and a second input timing value indicating a second input time, associated with the second user input, relative to the first reference time value.

Some aspects described herein relate to a non-transitory computer-readable medium that stores a set of instructions for wireless communication by a wireless communication device. The set of instructions, when executed by one or more processors of the wireless communication device, may cause the wireless communication device to receive a first beacon signal associated with a wireless access point asso- ciated with a gaming console, the first beacon signal indi- cating a first reference time value. The set of instructions, when executed by one or more processors of the wireless communication device, may cause the wireless communi- cation device to obtain, associated with a first input time, a first indication of a first user input to a user input device, wherein the wireless communication device is associated with the user input device. The set of instructions, when executed by one or more processors of the wireless com- munication device, may cause the wireless communication device to transmit a first communication comprising first user input data, associated with the first indication, and a first input timing value indicating the first input time relative to the first reference time value.

Some aspects described herein relate to a non-transitory computer-readable medium that stores a set of instructions for wireless communication by a wireless access point. The set of instructions, when executed by one or more processors of the wireless access point, may cause the wireless access point to transmit a first beacon signal indicating a first reference time value, wherein the wireless access point is associated with a gaming console. The set of instructions, when executed by one or more processors of the wireless access point, may cause the wireless access point to receive, from a first wireless communication device associated with a first user input device, a first communication comprising first user input data, associated with a first indication of a first user input to the first user input device, and a first input timing value indicating a first input time, associated with the first user input, relative to the first reference time value. The set of instructions, when executed by one or more processors of the wireless access point, may cause the wireless access point to receive, from a second wireless communication device associated with a second user input device, a second communication comprising second user input data, associ- ated with a second indication of a second user input to the second user input device, and a second input timing value indicating a second input time, associated with the second user input, relative to the first reference time value.

Some aspects described herein relate to an apparatus for wireless communication. The apparatus may include means for receiving a first beacon signal associated with a wireless access point associated with a gaming console, the first beacon signal indicating a first reference time value. The apparatus may include means for obtaining, associated with a first input time, a first indication of a first user input to a user input device, wherein the apparatus is associated with the user input device. The apparatus may include means for transmitting a first communication comprising first user input data, associated with the first indication, and a first input timing value indicating the first input time relative to the first reference time value.

Some aspects described herein relate to an apparatus for wireless communication. The apparatus may include means for transmitting a first beacon signal indicating a first reference time value, wherein the apparatus is associated with a gaming console. The apparatus may include means for receiving, from a first wireless communication device associated with a first user input device, a first communi- cation comprising first user input data, associated with a first indication of a first user input to the first user input device, and a first input timing value indicating a first input time, associated with the first user input, relative to the first reference time value. The apparatus may include means for receiving, from a second wireless communication device associated with a second user input device, a second com- munication comprising second user input data, associated with a second indication of a second user input to the second user input device, and a second input timing value indicating a second input time, associated with the second user input, relative to the first reference time value.

Aspects generally include a method, apparatus, system, computer program product, non-transitory computer-read- able medium, user equipment, base station, network entity, network node, central device, peripheral device, wireless communication device, and/or processing system as sub- stantially described herein with reference to and as illus- trated by the drawings and specification.

The foregoing has outlined rather broadly the features and technical advantages of examples according to the disclo- sure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrange- ments. For example, some aspects may be implemented via integrated chip embodiments or other non-module-compo- nent based devices (e.g., end-user devices, vehicles, com- munication devices, computing devices, industrial equip- ment, retail/purchasing devices, medical devices, and/or artificial intelligence devices). Aspects may be implemented in chip-level components, modular components, non-modu- lar components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio fre- quency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a wireless communication device, in accordance with the present disclosure.

FIG. 8 is a diagram illustrating an example process performed, for example, by a wireless access point, in accordance with the present disclosure.

DETAILED DESCRIPTION

Figure 1:
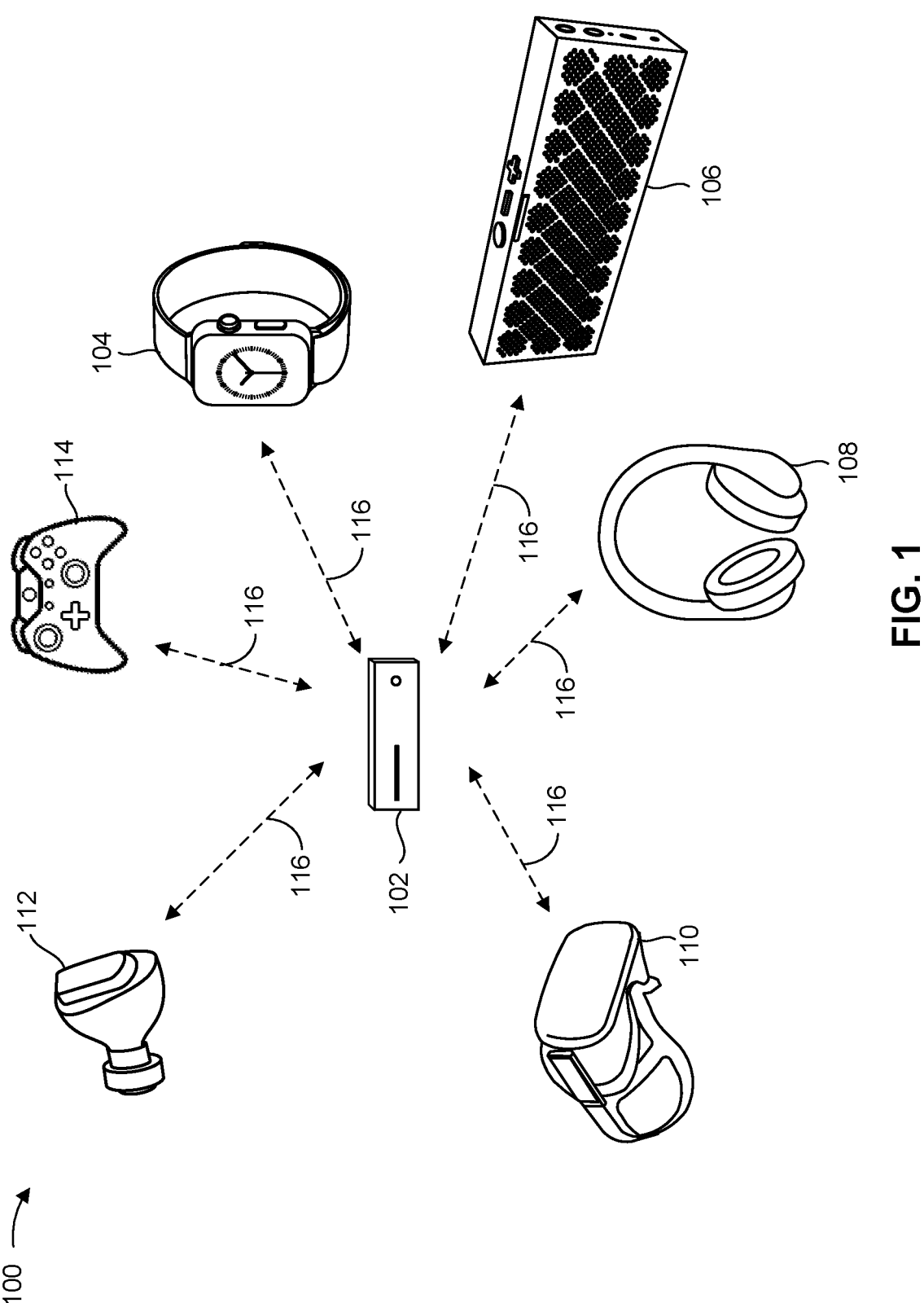
FIG. 1 is a diagram illustrating an example of a wireless personal area network (WPAN), according to some implementations.

In a wireless personal area network (WPAN), such as a Bluetooth (BT) network or a Bluetooth Low Energy (BLE) network, wireless audio may stream from a central source device (e.g., a handset, a gaming console) to multiple peripheral devices (e.g., gaming controllers). In a wireless local area network (WLAN), Wi-Fi features of a wireless access point (WAP) can be used for communications with one or more wireless communication devices.

Some aspects of the techniques and apparatuses described herein may facilitate indicating user input timing associated with user inputs to user input devices associated with a gaming console. In some aspects, a first user input may be obtained by a first WCD associated with a first user input device and a second user input may be obtained by a second WCD associated with a second user input device. The first WCD may transmit, to a WAP associated with a gaming console, a first communication including first user input data associated with the first user input. The first communication also may include an indication of a first user input timing, associated with the first user input, relative to a reference time. The second WCD may transmit, to the WAP, a second communication including second user input data associated with the second user input. The second communication also may include an indication of a second user input timing, associated with the second user input, relative to the reference time. The WAP and/or an application implemented in association with the gaming console may assign a user input order based on the first and second user input timings.

Particular aspects of the subject matter described in this disclosure can be implemented to realize one or more of the following potential advantages. In some examples, the described techniques can be used to facilitate fairness in gaming. For example, by including indications of user input timing in user input data communications, some aspects may enable gaming controllers to provide timing information associated with user inputs to the controllers, thereby enabling a receiving gaming console to assign a timing order to the user inputs. In this way, some aspects may facilitate assigning winners of games based on actual user input times as opposed to times at which the gaming console receives indications of the user inputs, thereby resulting in gaming fairness. By providing for indicating user input timing relative to a reference time, some aspects may ensure that user input timing is consistent between controllers.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology), such as a gaming console, may connect to and may establish a communication link 116 with one or more peripheral devices, such as a smartwatch 104, a portable speaker 106, wireless headphones 108, a head-mounted device (HMD) or extended (XR) reality headset 110, a wireless earbud 112, a wireless game controller 114 (which may be referred to herein as sink devices or using other suitable terminology) using a WPAN protocol such as a BLE protocol, a modified BLE protocol, a WiFi protocol, or a modified WiFi protocol, among other examples. In some aspects, the central device 102 may include a wireless access point (WAP) and each of the one or more peripheral devices may include a wireless communication device (WCD) configured to communicate with the WAP.

In some aspects, as described herein, the central device 102 may include suitable logic, circuitry, interfaces, processors, and/or code that may be used to communicate with the one or more peripheral devices 104, 106, 108, 110, 112, and/or 114. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, it will be appreciated that the central device 102 may communicate with more or fewer than six peripheral devices within the WPAN 100 without departing from the scope of the present disclosure.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
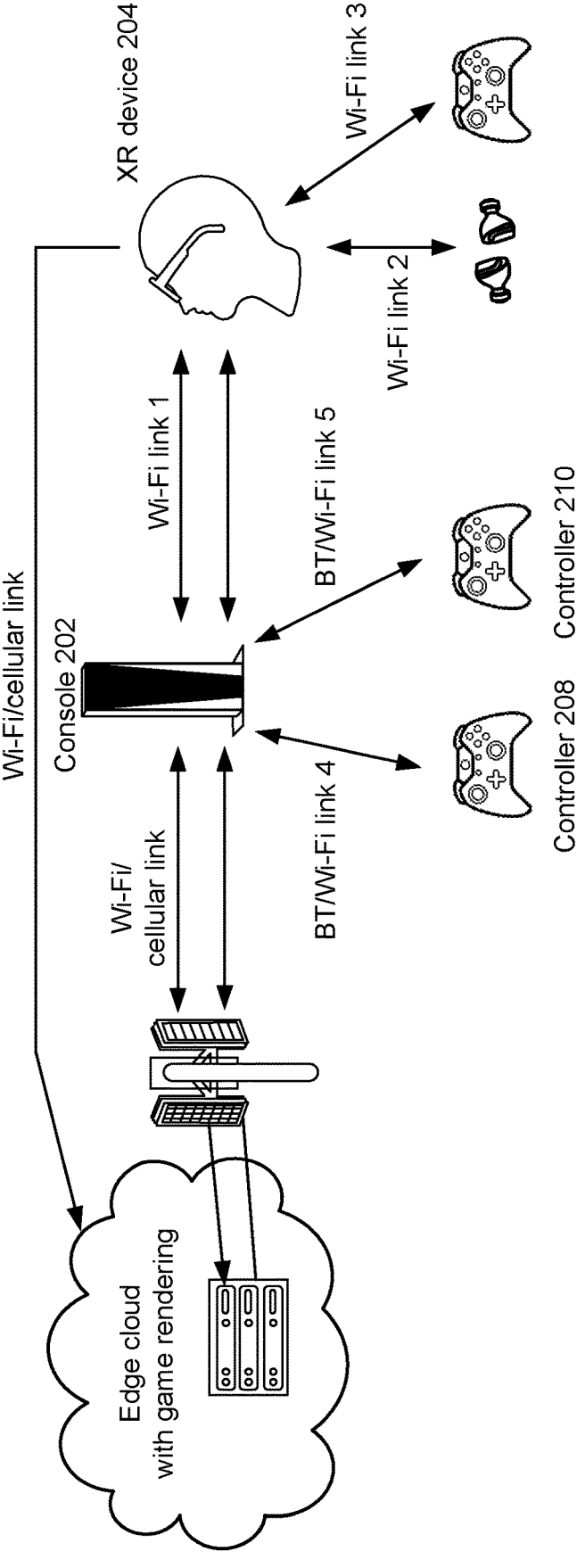
FIG. 2 is a diagram illustrating an example of a gaming system, in accordance with the present disclosure.

FIG. 2 is a diagram illustrating an example 200 of a gaming system, in accordance with the present disclosure.

A gaming system may include a central device, such as a gaming console 202 or an XR device 204 (e.g., HMD, XR glass). The central device may communicate with a gaming server or an edge cloud on the other side of a network entity (e.g., gNB). The edge server may split computations with the central device.

The central device may render video frames of a gaming application and communicate with peripheral devices, such as controller 208 and controller 210. The central device may transmit data to the peripheral devices in a broadcast, multicast, or in sequential unicast packets. The central device may transmit data and receive data from peripheral devices over a Bluetooth link or a Wi-Fi link. Example 200 shows different links that may be used for communication, such as Wi-Fi/cellular links, Wi-Fi link1, between the console 202 and the XR device 204. Wi-Fi link 2 between the XR device 204 and some earbuds, Wi-Fi link 3 between the XR device 204 and a controller, Bluetooth (BT)/Wi-Fi link 4 between the condole 202 and controller 208, and a BT/Wi-Fi link 5 between the console 202 and controller 210.

When console gaming or XR gaming is involved, there are timing issues. With a frame rate of 120 frames per second (fps), the end-to-end delay is expected to be 8.33 milliseconds (ms). With a typical host stack delay (controller software stack delay) of 2 ms and a console/glass processing budget (console software stack delay) of 2 ms, this allows for 2 ms of over-the-air latency (wireless medium delay). A clean channel (not used by other devices) in 5 GHz/6 GHz and ANI networks can reduce the impact of interference. However, multiple simultaneous controllers need to be supported (up to 4) and there can be some access issues.

Controller access may involve a target wake time (TWT) protocol, a random access protocol, or some type of proprietary channel access scheme. A TWT protocol is used in Wi-Fi to conserve battery power and to avoid uplink access contention. An AP may schedule TWT time durations during which a STA is awake and/or has uplink access to the wireless network. The STA is otherwise asleep and/or does not have uplink access to the network. TWT may avoid uplink access contention by scheduling different STAs to wake up and/or transmit at different times. A random access protocol may include sensing the channel and if the channel is not clear, backing off or waiting to sense again after a random amount of time.

As indicated above, FIG. 2 is provided as an example. Other examples may differ from what is described with regard to FIG. 2.

Figure 3:
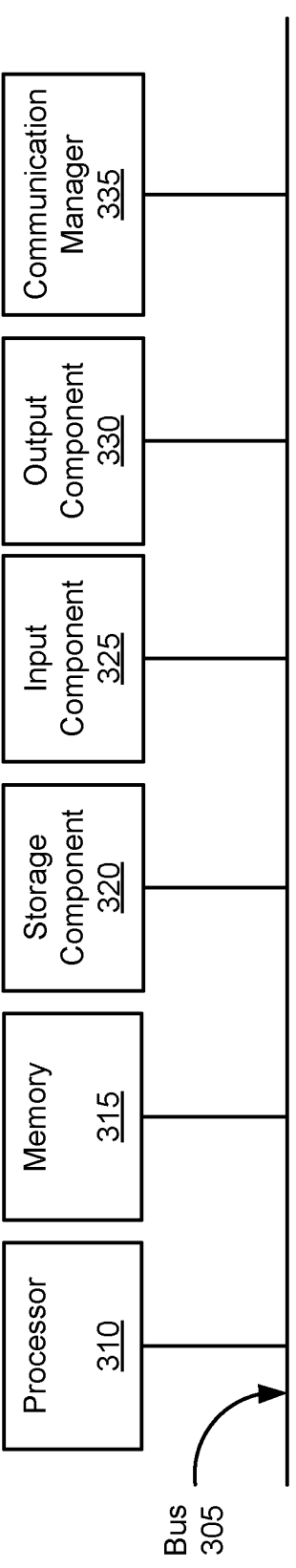
FIG. 3 is a diagram illustrating example components of a device, in accordance with the present disclosure.

FIG. 3 is a diagram illustrating example components of a device 300, in accordance with the present disclosure. Device 300 may correspond to WAP 202, WCD 204, WCD 206, gaming console 208, first user input device 210, or second user input device 212. In some aspects, WAP 202, WCD 204, WCD 206, gaming console 208, first user input device 210, or second user input device 212 may include one or more devices 300 and/or one or more components of device 300. As shown in FIG. 3, device 300 may include a bus 305, a processor 310, a memory 315, a storage component 320, an input component 325, an output component 330, and a communication manager 335.

Bus 305 includes a component that permits communication among the components of device 300. Processor 310 is implemented in hardware, firmware, or a combination of hardware and software. Processor 310 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a component for determining a position or a location of device 300 (e.g., a global positioning system (GPS) component or a global navigation satellite system (GNSS) component) and/or a sensor for sensing information (e.g., an accelerometer, a gyroscope, an actuator, or another type of position or environment sensor). Output component 330 includes a component that provides output information from device 300 (e.g., a display, a speaker, a haptic feedback component, and/or an audio or visual indicator).

Communication manager 335 may includes a transceiver-like component (e.g., a transceiver and/or a separate receiver and transmitter) that enables device 300 to communicate with other devices, such as via a wired connection, a wireless connection, or a combination of wired and wireless connections. Communication manager 335 may permit device 300 to receive information from another device and/or provide information to another device. For example, communication manager 335 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication manager 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 300 may include means for receiving a first beacon signal associated with a wireless access point associated with a gaming console, the first beacon signal indicating a first reference time value; means for obtaining, associated with a first input time, a first indication of a first user input to a user input device, wherein the wireless communication device is associated with the user input device; and/or means for transmitting a first communication comprising first user input data, associated with the first indication, and a first input timing value indicating the first input time relative to the first reference time value. In some aspects, device 300 may include means for transmitting a first beacon signal indicating a first reference time value, wherein the wireless access point is associated with a gaming console; means for receiving, from a first wireless communication device associated with a first user input device, a first communication comprising first user input data, associated with a first indication of a first user input to the first user input device, and a first input timing value indicating a first input time, associated with the first user input, relative to the first reference time value; and/or means for receiving, from a second wireless communication device associated with a second user input device, a second communication comprising second user input data, associated with a second indication of a second user input to the second user input device, and a second input timing value indicating a second input time, associated with the second user input, relative to the first reference time value. In some aspects, the means for device 300 to perform processes and/or operations described herein may include one or more components of device 300 described in connection with FIG. 3, such as bus 305, processor 310, memory 315, storage component 320, input component 325, output component 330, and/or communication manager 335.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
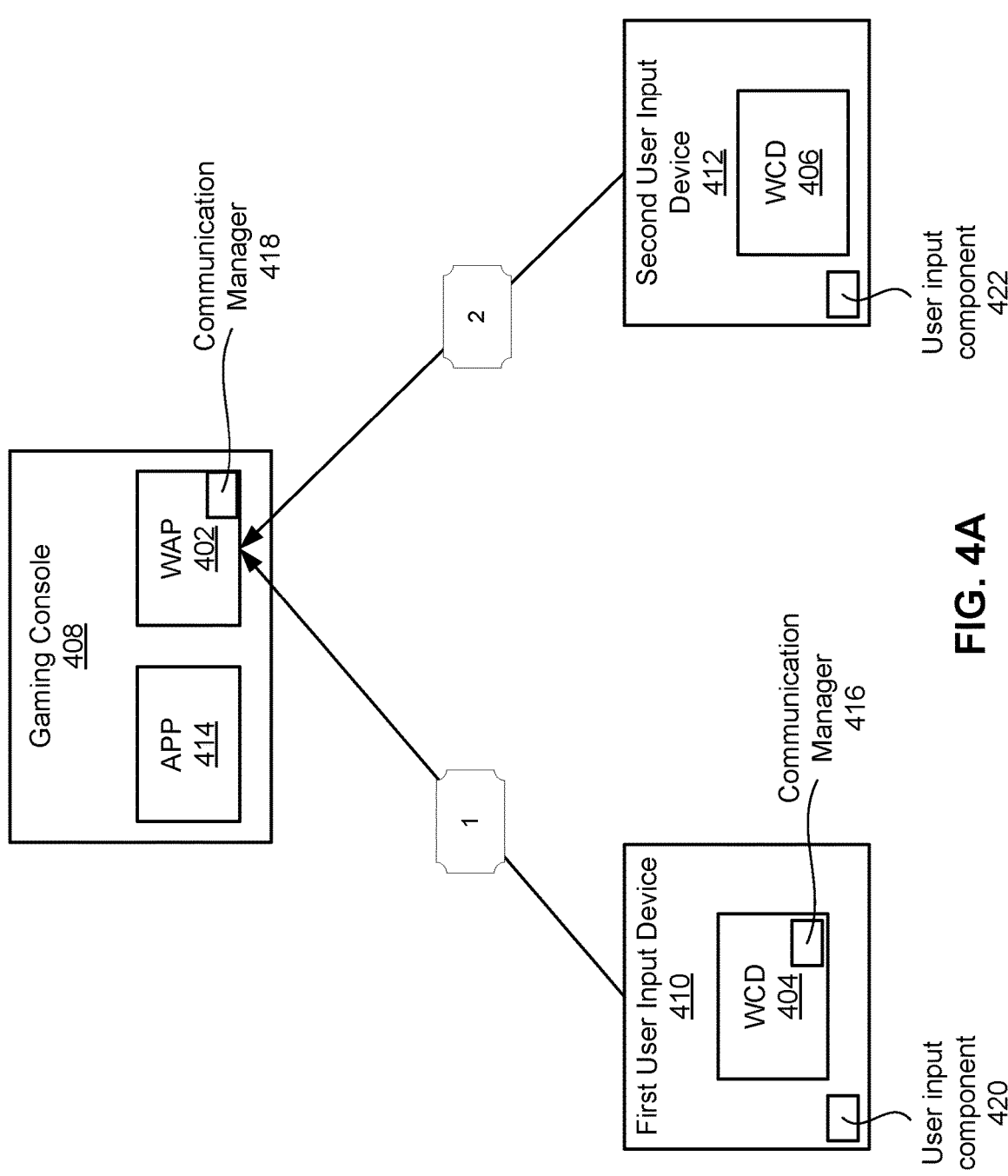
FIGS. 4A-4C illustrate examples of a wireless communication system that supports multi-user gaming in accordance with the present disclosure.
Figures 4B, 4C:
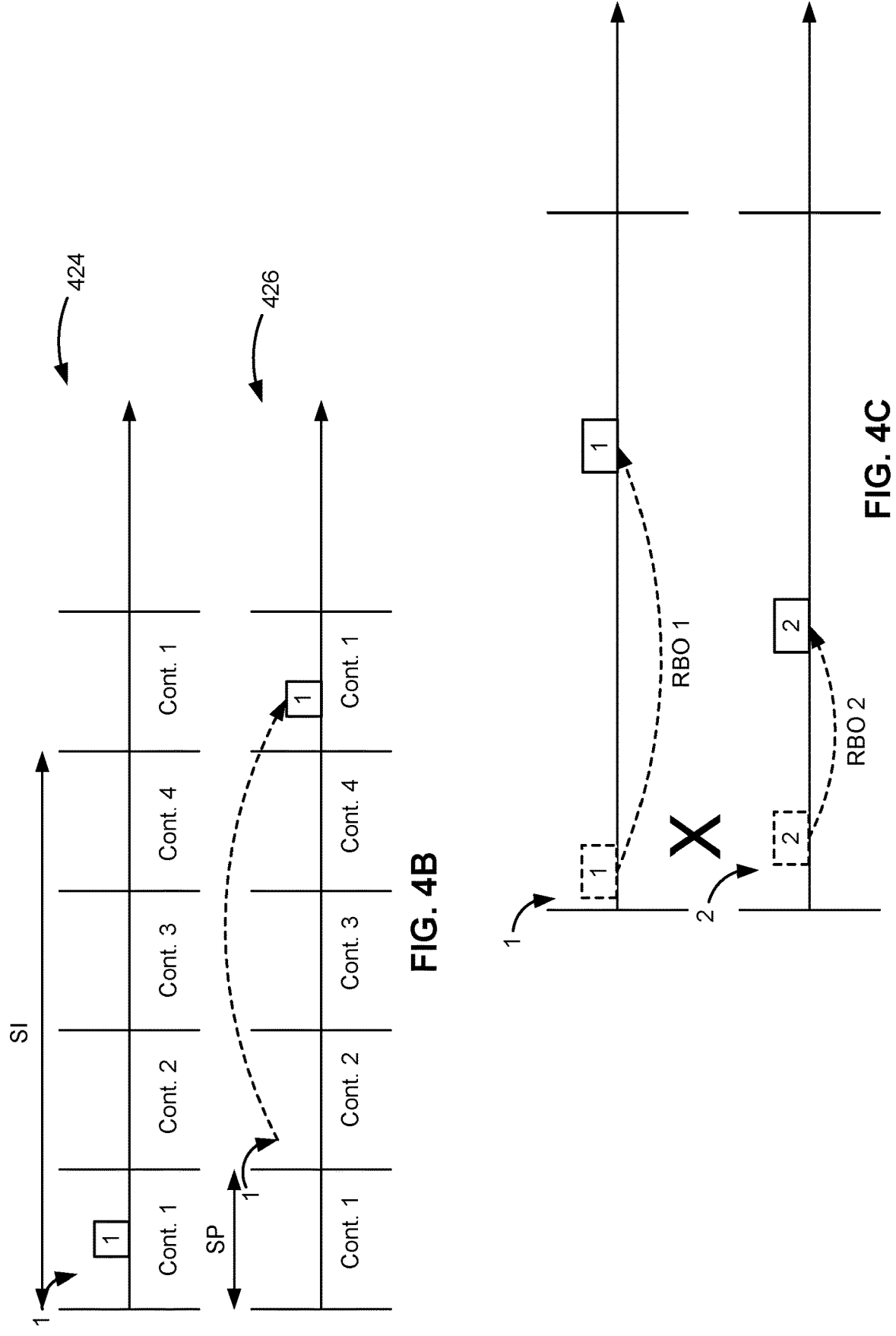

FIGS. 4A-4C illustrate examples of a wireless communication system 400 that supports multi-user gaming in accordance with the present disclosure. The wireless communication system 400 may implement or be implemented to realize aspects of the wireless communication system 100 and/or the gaming system of example 200. For example, the wireless communication system 400 illustrates communication between a WAP 402, a first WCD 404, and a second WCD 406. The WAP 402 may be associated with a gaming console 408, the first WCD 404 may be associated with a first user input device 410, and the second WCD 406 may be associated with a second user input device 412. The first user input device 410 and the second user input device 412 may be peripheral devices such as, for example, gaming controllers, XR headsets, and/or motion sensors. The WCD 404 and/or the WCD 406 may communicate with the WAP 402 via a WLAN and/or a WPAN, such as, for example, using a WiFi protocol or a modified WiFi protocol.

In some aspects, for example, the gaming console 408 may instantiate a gaming application ("APP") 414 to facilitate a gaming experience for users associated with the first user input device 410 and the second user input device 412. A communication manager 416 associated with the first WCD 404 may facilitate communication with the WAP 402, which also may include a communication manager 418. Although not illustrated in FIG. 4A, the second WCD 406 also may include a communication manager (e.g., similar to communication manager 416).

In operation, a first user may provide a first user input via a first user input component 420 of the first user input device 410. For example, the user input component 420 may include a button on a gaming controller, a joystick on a gaming controller, a directional pad on a gaming controller, a trigger on a gaming controller, an optical sensor, a motion sensor, an imaging device, a vibration sensor, and/or a sound sensor, among other examples. The WCD 404 may obtain an indication of the received first user input and may transmit a first communication ("1"), including first user input data associated with the first user input, to the WAP 402. The WAP 402 may receive the first communication, extract the first user input data from the first communication and provide the first user input data to the app 414. Similarly, a second user may provide a second user input via a second first user input component 422 of the second user input device 412. For example, the user input component 422 may include a button on a gaming controller, a joystick on a gaming controller, a directional pad on a gaming controller, a trigger on a gaming controller, an optical sensor, a motion sensor, an imaging device, a vibration sensor, and/or a sound sensor, among other examples. The WCD 406 may obtain an indication of the received second user input and may transmit a second communication ("2"), including second user input data associated with the second user input, to the WAP 402. The WAP 402 may receive the second communication, extract the second user input data from the second communication and provide the second user input data to the app 414.

In some aspects, the communication manager 416 may receive a first beacon signal associated with a wireless access point associated with a gaming console, the first beacon signal indicating a first reference time value; obtain, associated with a first input time, a first indication of a first user input to a user input device, wherein the wireless communication device is associated with the user input device; and transmit a first communication comprising first user input data, associated with the first indication, and a first input timing value indicating the first input time relative to the first reference time value. Additionally, or alternatively, the communication manager 416 may perform one or more other operations described herein.

In some aspects, the communication manager 418 may transmit a first beacon signal indicating a first reference time value, wherein the wireless access point is associated with a gaming console; receive, from a first wireless communication device associated with a first user input device, a first communication comprising first user input data, associated with a first indication of a first user input to the first user input device, and a first input timing value indicating a first input time, associated with the first user input, relative to the first reference time value; and receive, from a second wireless communication device associated with a second user input device, a second communication comprising second user input data, associated with a second indication of a second user input to the second user input device, and a second input timing value indicating a second input time, associated with the second user input, relative to the first reference time value. Additionally, or alternatively, the communication manager 418 may perform one or more other operations described herein.

In some cases, the WCD 404 and the WCD 406 may be expected to meet a latency constraint for various applications or use cases (e.g., an ultra-low-latency constraint for a ULL gaming use case) and also facilitate coexistence between XPAN, WPAN, WLAN, and/or other concurrency scenarios on the WCDs 404 and 406. To meet the latency constraints associated with, for example, ULL gaming, the WAP 402 may employ a target wake time (TWT) technique for the communication between the WAP 402 (which may act or function as a soft access point (SAP)) and each of the WCD 404 and WCD 406, as shown in the scheduled access scheme illustrated in FIG. 4B.

As illustrated, individual TWT service periods (SPs) can be used for uplink access in an uplink slot. A TWT service interval (SI) can include a number of SPs. For example, as shown, an SI may include individual SPs for each of four different controllers (indicated as "cont. 1," "cont. 2," "cont. 3," and "cont. 4"). In some cases, as shown, the SPs assigned to the multiple controllers may not overlap. A sequence of uplink access may include uplink data from controller 1 ("cont. 1") and uplink data from controller 2 ("cont. 2"), up through the uplink data from controller N. In some other cases, the SPs assigned to multiple controllers may partially overlap. As shown in a scenario 424, a first WCD 404 may obtain the indication ("1") of the first user input during a first SP associated with the first user input device (e.g., "cont. 1") and may transmit a first communication (shown as a box containing "1") including first user input data associated with the first user input during the SP. However, as shown in a scenario 426, if the first WCD 404 obtains the indication ("1") during an SP associated with another user input device (e.g., an SP associated with cont. 2), the first WCD 404 waits until the next SP associated with the first user input device to transmit the first communication.

In this case, if the second WCD 406 obtains a second user input during the SP associated with the second user input device ("cont. 2"), the WCD 406 can transmit a second communication including second user input data associated with the second user input prior to the transmission of the first communication. As a result, the WAP 402 may receive an indication of the second user input prior to receiving an indication of the first user input and may, therefore, assign a merit status (e.g., a status of winner of a contest in which the first user to provide a user input wins) to the second user input device even though the first user input device actually received user input first, resulting in an unfair gaming result.

FIG. 4C illustrates a random access scheme for uplink access to facilitate transmissions from the WCD 404 and/or WCD 406 to the WAP 402. The random access scheme may involve sensing the channel (shown by boxes having dashed lines) and, if a collision (shown by the "X") is detected, backing off a random amount of time before transmitting or sensing again in the frame. This may also be referred to as "random backoff" or "RBO." In this case, as shown, a first WCD 404 may obtain the indication ("1") of the first user input prior to the second WCD 406 obtaining the indication ("2") of the second user input, but due to a detected collision, the first WCD 404 and the second WCD 406 may apply RBO 1 and RBO 2, respectively. If RBO 1 is greater than RBO 2, as shown, the WAP 402 may receive an indication of the second user input prior to receiving an indication of the first user input and may, therefore, assign a merit status (e.g., a status of winner of a contest in which the first user to provide a user input wins) to the second user input device even though the first user input device actually received user input first, resulting in an unfair gaming result.

Some aspects of the techniques and apparatuses described herein may facilitate indicating user input timing associated with user inputs to user input devices associated with a gaming console. In some aspects, a first user input may be obtained by a first WCD associated with a first user input device and a second user input may be obtained by a second WCD associated with a second user input device. The first WCD may transmit, to a WAP associated with a gaming console, a first communication including first user input data associated with the first user input. The first communication also may include an indication of a first user input timing, associated with the first user input, relative to a reference time. The second WCD may transmit, to the WAP, a second communication including second user input data associated with the second user input. The second communication also may include an indication of a second user input timing, associated with the second user input, relative to the reference time. The WAP and/or an application implemented in association with the gaming console may assign a user input order based on the first and second user input timings. In this way, some aspects may facilitate assigning winners of games based on actual user input times as opposed to times at which the gaming console receives indications of the user inputs, thereby resulting in gaming fairness.

As indicated above, FIGS. 4A-4C are provided as examples. Other examples may differ from what is described with regard to FIGS. 4A-4C.

Figure 5:
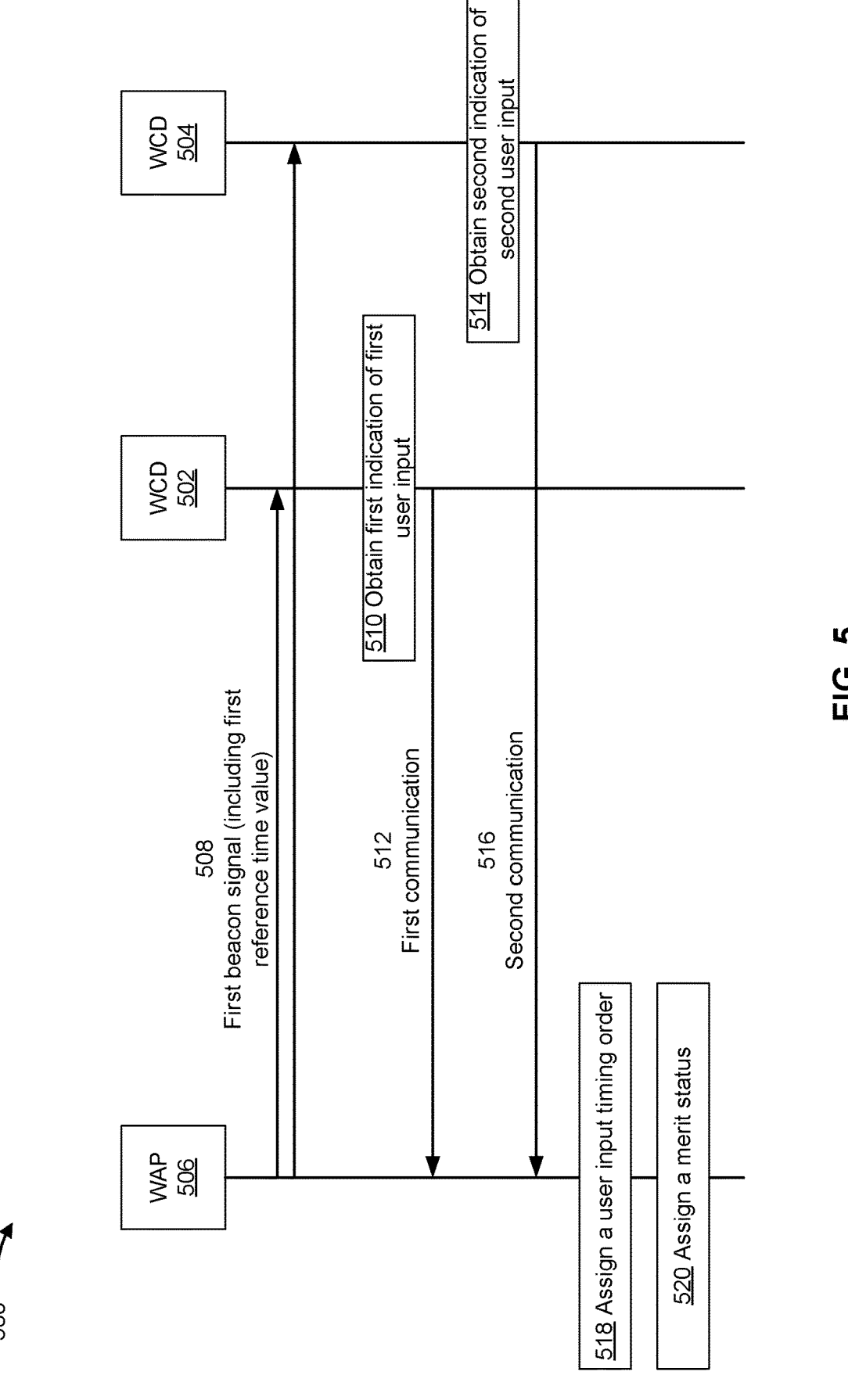
FIG. 5 is a diagram illustrating an example associated with indicating user input times, in accordance with the present disclosure.

FIG. 5 is a diagram illustrating an example 500 associated with indicating user input times, in accordance with the present disclosure. Example 500 includes a first WCD 502 (e.g., WCD 204), a second WCD 504 (e.g., WCD 206), and a WAP 506 (e.g., WAP 202). In some examples, the WAP 506 may include a soft AP (SAP) and the WCDs 502 and 504 may include stations such as one or more peripheral devices. In some aspects, the first WCD 502 and/or the second WCD 504 may be associated with a game controller and the WAP 506 may be associated with a gaming console. The WCD 502 and the WCD 504 may communicate, using wireless communication, with the WAP 506. In some aspects, the wireless communication may be associated with a wireless local area network (WLAN). In some aspects, the wireless communication may be associated with a wireless personal area network (WPAN). In some aspects, the wireless communication may be associated with a Wi-Fi network.

As shown by reference number 508, the WAP 506 may transmit a first beacon signal. The first beacon signal may be associated with the WAP 506. The first beacon signal may indicate a first reference time value. In some aspects, the first reference time value may be associated with a timing synchronization function (TSF) associated with the WAP 506. In some aspects, the first reference time value may include an absolute time value. In some aspects, the first reference time value may include a relative time value associated with a prior reference time value. For example, the WAP 506 may periodically transmit beacon signals and each beacon signal may indicate an updated reference time relative to the prior beacon signal. For example, in some aspects, a first beacon signal may indicate an absolute time value, a second beacon signal may indicate a difference between the absolute time value and a time at which the second beacon signal is transmitted, a third beacon signal may indicate a difference between the time at which the second beacon signal is transmitted and a time at which the third beacon signal is transmitted, and so on. In some aspects, the first reference time value may include a relative time value associated with an absolute time value. For example, a first beacon signal may indicate an absolute time value, a second beacon signal may indicate a difference between the absolute time value and a time at which the second beacon signal is transmitted, a third beacon signal may indicate a difference between the absolute time value and a time at which the third beacon signal is transmitted, and so on.

As shown by reference number 510, the first WCD 502 may obtain a first indication of a first user input to a first user input device. The WCD 502 may be associated with the first user input device. As shown by reference number 512, the first WCD 502 may transmit, and the WAP 506 may receive, a first communication. The first communication may include first user input data, associated with the first indication, and a first input timing value indicating the first input time relative to the first reference time value. In some aspects, the first input timing value may be embedded within the first user input data and/or the second input timing value may be embedded within the second user input data. In some aspects, the first communication may include a timing value identifier that indicates the first input timing value and/or the second communication may include a timing value identifier that indicates the second input timing value.

As shown by reference number 514, the second WCD 504 may obtain a second indication of a second user input to a second user input device. The WCD 504 may be associated with the second user input device. As shown by reference number 516, the second WCD 504 may transmit, and the WAP 506 may receive, a second communication. The second communication may include second user input data, associated with the second indication, and a second input timing value indicating the second input time relative to the first reference time value. In some aspects, the WCD 502 may transmit additional communications before a second beacon signal is received. Each of the additional communications may include an input time relative to the first reference time value. The WCD 502 may transmit an additional communication after a second beacon signal, including a second reference time value, is received and, in this case, the additional communication may include an input time relative to the second reference time value.

As shown by reference number 518, the WAP 506 may assign a user input timing order associated with the first user input data and the second user input data. For example, the WAP 506 may assign the user input timing order in association with the first input timing value and the second input timing value. In some aspects, the first input timing value may be equal to the second input timing value, and assigning the user input timing order may include assigning the user input timing order in association with a tie-breaking scheme. In some aspects, the tie-breaking scheme may be associated with a pseudo random number generator. For example, the WAP 506 and/or an application associated with a gaming console that is associated with the WAP 506, May generate, in association with the pseudo random number generator, a first pseudo random value associated with the first user input data and a second pseudo random value associated with the second user input data, and may assign the user input timing order in association with the first pseudo random number value and the second pseudo random number value. In some aspects, the first input timing value may be equal to the second input timing value, and the tie-breaking scheme may include a round-robin scheme.

As shown by reference number 520, the WAP 506 may assign a merit status, based on the user input timing order, to one of the first user input device or the second user input device. The merit status may include an indication of a winner of a game associated with the gaming console.

As indicated above, FIG. 5 is provided as an example. Other examples may differ from what is described with regard to FIG. 5.

Figures 6A, 6B:
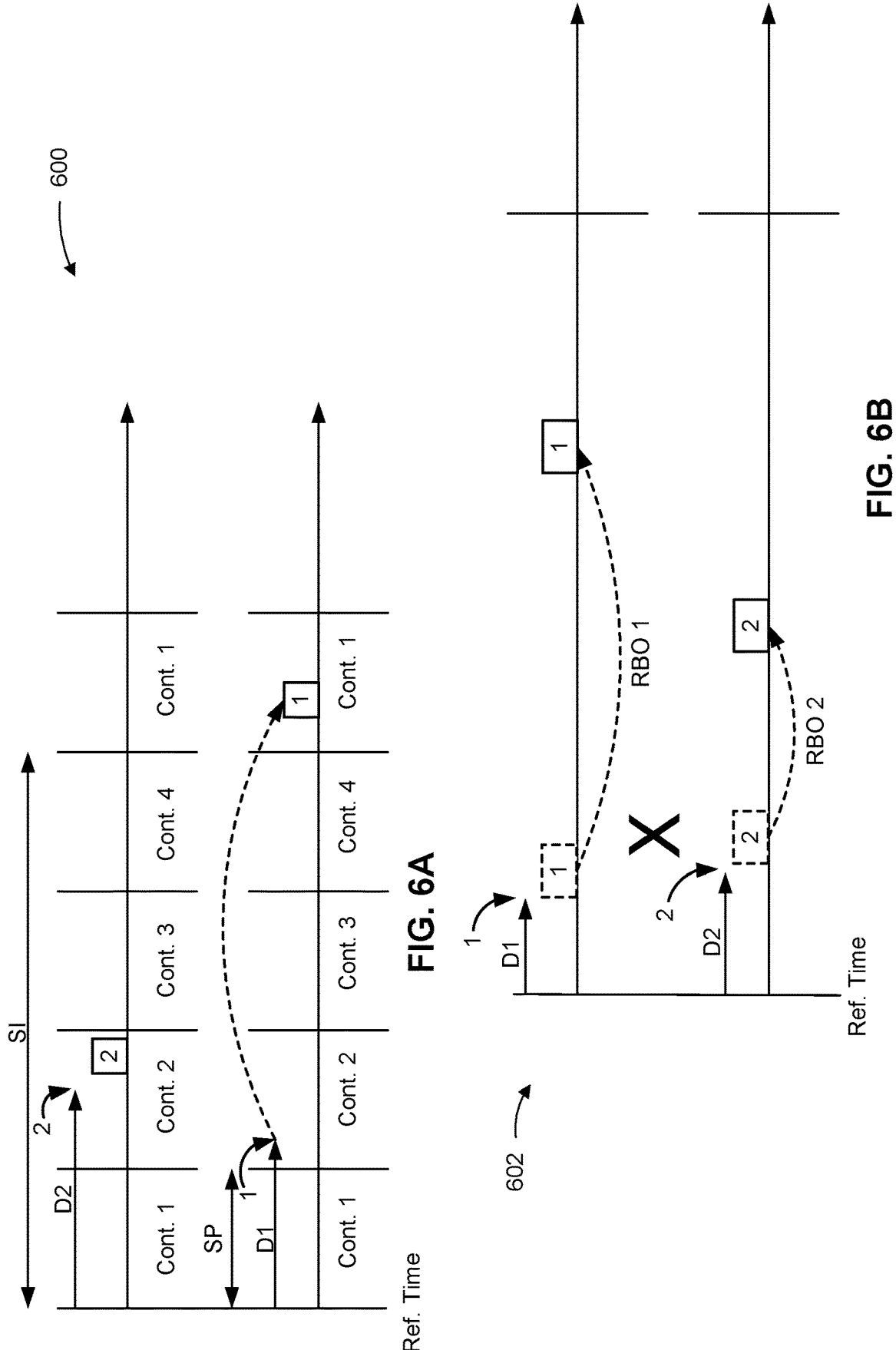
FIG. 6A is a diagram illustrating an example associated with indicating user input timing in a scheduled access scheme, in accordance with the present disclosure.
FIG. 6B is a diagram illustrating an example associated with indicating user input timing in a random access scheme, in accordance with the present disclosure.

FIG. 6A is a diagram illustrating an example 600 associated with indicating user input timing in a scheduled access scheme, in accordance with the present disclosure. Aspects of example 600 may be performed by a first WCD (e.g., WCD 502), a second WCD (e.g., WCD 504), and a WAP (e.g., WAP 506). As shown, a first WCD may obtain an indication ("1") of a first user input during an SP associated with another user input device (e.g., an SP associated with cont. 2), in which case the first WCD waits until the next SP associated with the first user input device to transmit the first communication.

In this case, if the second WCD obtains a second user input ("2") during the SP associated with the second user input device ("cont. 2"), the second WCD can transmit a second communication including second user input data associated with the second user input prior to the transmission of the first communication. As a result, the WAP 402 may receive an indication of the second user input prior to receiving an indication of the first user input. However, in some aspects, as described in connection with FIG. 5, the first communication may include an indication of the first user input timing relative to a reference time ("Ref. time") and the second communication may include an indication of the second user input timing relative to the reference timing. For example, the first communication may include a first difference ("D1") between the reference time and the time at which the first user input is obtained and the second communication may include a second difference ("D2") between the reference time and the time at which the second user input is obtained. Thus, the WAP may assign a user input timing order based on D1 and D2 and may, therefore, assign a merit status (e.g., a status of winner of a contest in which the first user to provide a user input wins) to the first user input device based on determining that D2>D1, resulting in a fair gaming result.

FIG. 6B is a diagram illustrating an example 602 associated with indicating user input timing in a random access scheme, in accordance with the present disclosure. Aspects of example 600 may be performed by a first WCD (e.g., WCD 502), a second WCD (e.g., WCD 504), and a WAP (e.g., WAP 506). The random access scheme may involve sensing the channel (shown by boxes having dashed lines) and, if a collision (shown by the "X") is detected, backing off a random amount of time before transmitting or sensing again in the frame. In this case, as shown, a first WCD may obtain the indication ("1") of the first user input prior to the second WCD obtaining the indication ("2") of the second user input, but due to a detected collision, the first WCD and the second WCD may apply RBO 1 and RBO 2, respectively. If RBO 1 is greater than RBO 2, as shown, the WAP may receive an indication of the second user input prior to receiving an indication of the first user input.

However, in some aspects, as described in connection with FIG. 5, the first communication may include an indication of the first user input timing relative to a reference time ("Ref. time") and the second communication may include an indication of the second user input timing relative to the reference timing. For example, the first communication may include a first difference ("D1") between the reference time and the time at which the first user input is obtained and the second communication may include a second difference ("D2") between the reference time and the time at which the second user input is obtained. Thus, the WAP may assign a user input timing order based on D1 and D2 and may, therefore, assign a merit status (e.g., a status of winner of a contest in which the first user to provide a user input wins) to the first user input device based on determining that D2>D1, resulting in a fair gaming result.

As indicated above, FIGS. 6A and 6B are provided as examples. Other examples may differ from what is described with regard to FIGS. 6A and 6B.

FIG. 7 is a diagram illustrating an example process 700 performed, for example, by a wireless communication device, in accordance with the present disclosure. Example process 700 is an example where the wireless communication device (e.g., WCD 502) performs operations associated with indicating user input timing.

As shown in FIG. 7, in some aspects, process 700 may include receiving a first beacon signal associated with a wireless access point associated with a gaming console, the first beacon signal indicating a first reference time value (block 710). For example, the wireless communication device (e.g., using reception component 902 and/or communication manager 906, depicted in FIG. 9) may receive a first beacon signal associated with a wireless access point associated with a gaming console, the first beacon signal indicating a first reference time value, as described above.

As further shown in FIG. 7, in some aspects, process 700 may include obtaining, associated with a first input time, a first indication of a first user input to a user input device, wherein the wireless communication device is associated with the user input device (block 720). For example, the wireless communication device (e.g., using reception component 902 and/or communication manager 906, depicted in FIG. 9) may obtain, associated with a first input time, a first indication of a first user input to a user input device, wherein the wireless communication device is associated with the user input device, as described above.

As further shown in FIG. 7, in some aspects, process 700 may include transmitting a first communication comprising first user input data, associated with the first indication, and a first input timing value indicating the first input time relative to the first reference time value (block 730). For example, the wireless communication device (e.g., using transmission component 904 and/or communication manager 906, depicted in FIG. 9) may transmit a first communication comprising first user input data, associated with the first indication, and a first input timing value indicating the first input time relative to the first reference time value, as described above.

Process 700 may include additional aspects, such as any single aspect or any combination of aspects described below and/or in connection with one or more other processes described elsewhere herein.

In a first aspect, the first reference time value is associated with a TSF associated with the wireless access point. In a second aspect, alone or in combination with the first aspect, the first reference time value comprises an absolute time value. In a third aspect, alone or in combination with one or more of the first and second aspects, the first reference time value comprises a relative time value associated with a prior reference time value. In a fourth aspect, alone or in combination with one or more of the first through third aspects, the first reference time value comprises a relative time value associated with an absolute time value. In a fifth aspect, alone or in combination with one or more of the first through fourth aspects, the user input device comprises a game controller.

In a sixth aspect, alone or in combination with one or more of the first through fifth aspects, process 700 includes obtaining, associated with a second input time, a second indication of a second user input to the user input device, and transmitting a second communication comprising second user input data, associated with the second indication, and a second input timing value indicating the second input time relative to the first reference time value. In a seventh aspect, alone or in combination with one or more of the first through fifth aspects, process 700 includes receiving a second beacon signal indicating a second reference time value, obtaining, at a second input time, a second indication of a second user input to the user input device, and transmitting a second communication comprising second user input data, associated with the second indication, and a second input timing value indicating the second input time relative to the second reference time value.

In an eighth aspect, alone or in combination with one or more of the first through seventh aspects, the first input timing value is embedded within the first user input data. In a ninth aspect, alone or in combination with one or more of the first through eighth aspects, the first communication comprises a timing value identifier that indicates the first input timing value. In a tenth aspect, alone or in combination with one or more of the first through ninth aspects, the wireless communication is associated with a wireless area network. In an eleventh aspect, alone or in combination with one or more of the first through tenth aspects, the wireless communication is associated with a personal area network. In a twelfth aspect, alone or in combination with one or more of the first through eleventh aspects, the wireless communication is associated with a Wi-Fi network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a wireless access point, in accordance with the present disclosure. Example process 800 is an example where the wireless access point (e.g., WAP 506) performs operations associated with indicating user input timing.

As shown in FIG. 8, in some aspects, process 800 may include transmitting a first beacon signal indicating a first reference time value, wherein the wireless access point is associated with a gaming console (block 810). For example, the wireless access point (e.g., using transmission component 1004 and/or communication manager 1006, depicted in FIG. 10) may transmit a first beacon signal indicating a first reference time value, wherein the wireless access point is associated with a gaming console, as described above.

As further shown in FIG. 8, in some aspects, process 800 may include receiving, from a first wireless communication device associated with a first user input device, a first communication comprising first user input data, associated with a first indication of a first user input to the first user input device, and a first input timing value indicating a first input time, associated with the first user input, relative to the first reference time value (block 820). For example, the wireless access point (e.g., using reception component 1002 and/or communication manager 1006, depicted in FIG. 10) may receive, from a first wireless communication device associated with a first user input device, a first communication comprising first user input data, associated with a first indication of a first user input to the first user input device, and a first input timing value indicating a first input time, associated with the first user input, relative to the first reference time value, as described above.

As further shown in FIG. 8, in some aspects, process 800 may include receiving, from a second wireless communication device associated with a second user input device, a second communication comprising second user input data, associated with a second indication of a second user input to the second user input device, and a second input timing value indicating a second input time, associated with the second user input, relative to the first reference time value (block 830). For example, the wireless access point (e.g., using reception component 1002 and/or communication manager 1006, depicted in FIG. 10) may receive, from a second wireless communication device associated with a second user input device, a second communication comprising second user input data, associated with a second indication of a second user input to the second user input device, and a second input timing value indicating a second input time, associated with the second user input, relative to the first reference time value, as described above.

Process 800 may include additional aspects, such as any single aspect or any combination of aspects described below and/or in connection with one or more other processes described elsewhere herein.

In a first aspect, the first reference time value is associated with a TSF associated with the wireless access point. In a second aspect, alone or in combination with the first aspect, the first reference time value comprises an absolute time value. In a third aspect, alone or in combination with one or more of the first and second aspects, the first reference time value comprises a relative time value associated with a prior reference time value. In a fourth aspect, alone or in combination with one or more of the first through third aspects, the first reference time value comprises a relative time value associated with an absolute time value. In a fifth aspect, alone or in combination with one or more of the first through fourth aspects, the first user input device comprises a first game controller and the second user input device comprises a second game controller. In a sixth aspect, alone or in combination with one or more of the first through fifth aspects, process 800 includes transmitting a second beacon signal indicating a second reference time value, and receiving a third communication comprising third user input data, associated with a third user input to the first user input device, and a third input timing value indicating a third input time relative to the second reference time value.

In a seventh aspect, alone or in combination with one or more of the first through sixth aspects, process 800 includes assigning, in association with the first input timing value and the second input timing value, a user input timing order associated with the first user input data and the second user input data. In an eighth aspect, alone or in combination with the seventh aspect, the first input timing value is equal to the second input timing value, and wherein assigning the user input timing order comprises assigning the user input timing order in association with a tie-breaking scheme. In a ninth aspect, alone or in combination with the eighth aspect, the tie-breaking scheme is associated with a pseudo random number generator, and wherein assigning the user input timing order comprises generating, in association with the pseudo random number generator, a first pseudo random value associated with the first user input data, generating, in association with the pseudo random number generator, a second pseudo random value associated with the second user input data, and assigning the user input timing order in association with the first pseudo random number value and the second pseudo random number value. In a tenth aspect, alone or in combination with the eighth aspect, the first input timing value is equal to the second input timing value, and wherein the tie-breaking scheme comprises a round-robin scheme.

In an eleventh aspect, alone or in combination with one or more of the seventh through tenth aspects, process 800 includes assigning, based on the user input timing order, a merit status to one of the first user input device or the second user input device. In a twelfth aspect, alone or in combination with the eleventh aspect, the merit status comprises an indication of a winner of a game associated with the gaming console. In a thirteenth aspect, alone or in combination with one or more of the first through twelfth aspects, the first input timing value is embedded within the first user input data. In a fourteenth aspect, alone or in combination with one or more of the first through thirteenth aspects, the first communication comprises a timing value identifier that indicates the first input timing value.

In a fifteenth aspect, alone or in combination with one or more of the first through fourteenth aspects, the wireless communication is associated with a wireless area network. In a sixteenth aspect, alone or in combination with one or more of the first through fifteenth aspects, the wireless communication is associated with a personal area network. In a seventeenth aspect, alone or in combination with one or more of the first through sixteenth aspects, the wireless communication is associated with a Wi-Fi network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
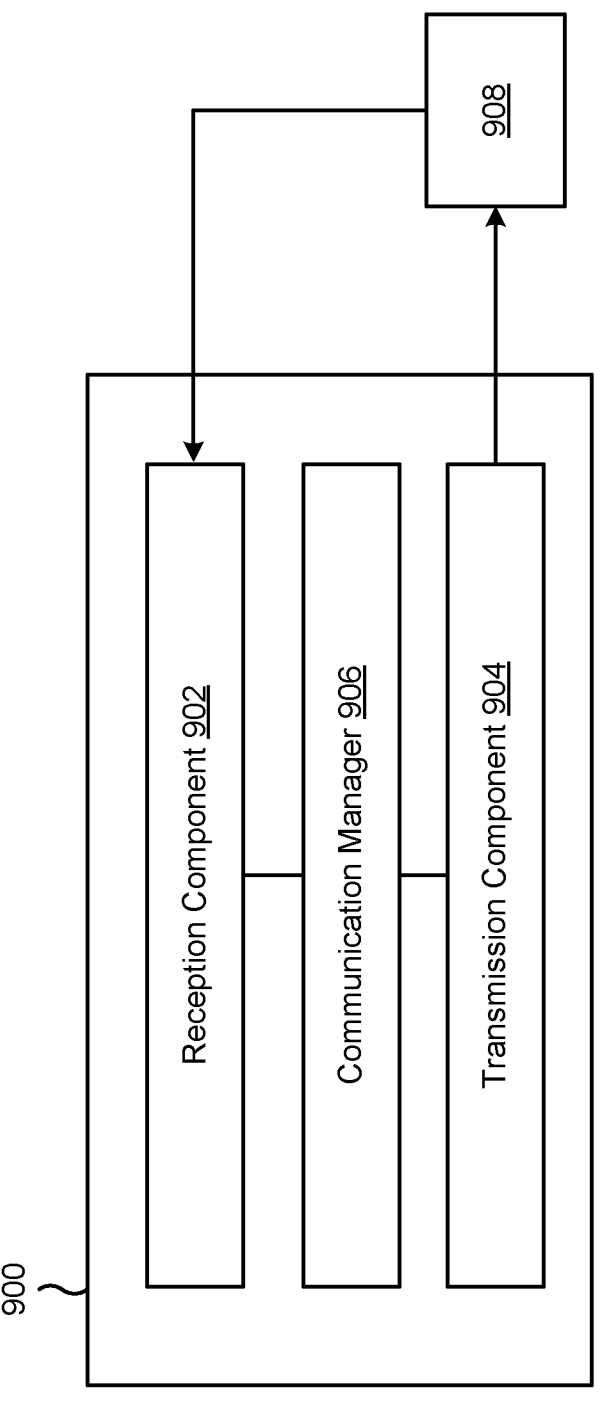
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a wireless communication device, or a wireless communication device may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 335 described in connection with FIG. 3 and/or the communication manager 416 described in connection with FIG. 4A. As shown, the apparatus 900 may communicate with another apparatus 908, such as a WAP, using the reception component 902 and the transmission component 904.

In some aspects, the apparatus 900 may be configured to perform one or more operations described herein in connection with FIGS. 5-6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the device 300 described in connection with FIG. 3. Additionally, or alternatively, one or more components shown in FIG. 9 may be implemented within one or more more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a receive processor, a controller/processor, a memory, or a combination thereof, of the device 300 described in connection with FIG. 3.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit processor, a controller/processor, a memory, or a combination thereof, of the device 300 described in connection with FIG. 3. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a first beacon signal associated with a wireless access point associated with a gaming console, the first beacon signal indicating a first reference time value. The reception component 902 may obtain, associated with a first input time, a first indication of a first user input to a user input device, wherein the wireless communication device is associated with the user input device. The transmission component 904 may transmit a first communication comprising first user input data, associated with the first indication, and a first input timing value indicating the first input time relative to the first reference time value.

The reception component 902 may obtain, associated with a second input time, a second indication of a second user input to the user input device. The transmission component

904 may transmit a second communication comprising second user input data, associated with the second indication, and a second input timing value indicating the second input time relative to the first reference time value. The reception component 902 may receive a second beacon signal indicating a second reference time value. The reception component 902 may obtain, at a second input time, a second indication of a second user input to the user input device. The transmission component 904 may transmit a second communication comprising second user input data, associated with the second indication, and a second input timing value indicating the second input time relative to the second reference time value.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
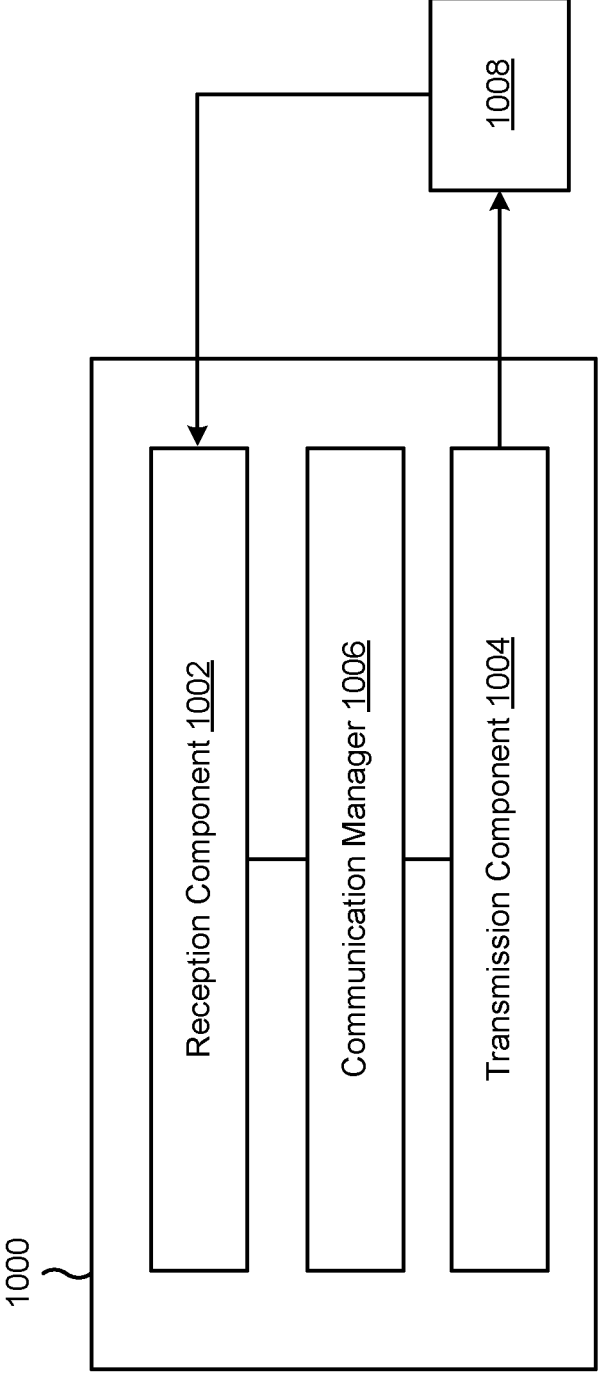
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a wireless access point, or a wireless access point may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 335 described in connection with FIG. 3 and/or the communication manager 418 described in connection with FIG. 4A. As shown, the apparatus 1000 may communicate with another apparatus 1008, such as a WCD or a network node (such as a CU, a DU, an RU, or a base station), using the reception component 1002 and the transmission component 1004.

In some aspects, the apparatus 1000 may be configured to perform one or more operations described herein in connection with FIGS. 5-6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the device 300 described in connection with FIG. 3. Additionally, or alternatively, one or more components shown in FIG. 10 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a receive processor, a controller/processor, a memory, or a combination thereof, of the device 300 described in connection with FIG. 3.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit processor, a controller/processor, a memory, or a combination thereof, of the device 300 described in connection with FIG. 3. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit a first beacon signal indicating a first reference time value, wherein the wireless access point is associated with a gaming console. The reception component 1002 may receive, from a first wireless communication device associated with a first user input device, a first communication comprising first user input data, associated with a first indication of a first user input to the first user input device, and a first input timing value indicating a first input time, associated with the first user input, relative to the first reference time value. The reception component 1002 may receive, from a second wireless communication device associated with a second user input device, a second communication comprising second user input data, associated with a second indication of a second user input to the second user input device, and a second input timing value indicating a second input time, associated with the second user input, relative to the first reference time value.

The transmission component 1004 may transmit a second beacon signal indicating a second reference time value. The reception component 1002 may receive a third communication comprising third user input data, associated with a third user input to the first user input device, and a third input timing value indicating a third input time relative to the second reference time value. The communication manager 1006 may assign, in association with the first input timing value and the second input timing value, a user input timing order associated with the first user input data and the second user input data. The communication manager 1006 may assign, based on the user input timing order, a merit status to one of the first user input device or the second user input device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method for wireless communication performable at a wireless communication device, comprising: receiving a first beacon signal associated with a wireless access point associated with a gaming console, the first beacon signal indicating a first reference time value; obtaining, associated with a first input time, a first indication of a first user input to a user input device, wherein the wireless communication device is associated with the user input device; and transmitting a first communication comprising first user input data, associated with the first indication, and a first input timing value indicating the first input time relative to the first reference time value.

Aspect 2: The method of Aspect 1, wherein the first reference time value is associated with a timing synchronization function (TSF) associated with the wireless access point.

Aspect 3: The method of either of claim 1 or 2, wherein the first reference time value comprises an absolute time value.

Aspect 4: The method of either of claim 1 or 2, wherein the first reference time value comprises a relative time value associated with a prior reference time value.

Aspect 5: The method of any of Aspects 1-4, wherein the first reference time value comprises a relative time value associated with an absolute time value.

Aspect 6: The method of any of Aspects 1-5, wherein the user input device comprises a game controller.

Aspect 7: The method of any of Aspects 1-6, further comprising: obtaining, associated with a second input time, a second indication of a second user input to the user input device; and transmitting a second communication comprising second user input data, associated with the second indication, and a second input timing value indicating the second input time relative to the first reference time value.

Aspect 8: The method of any of Aspects 1-6, further comprising: receiving a second beacon signal indicating a second reference time value; obtaining, at a second input time, a second indication of a second user input to the user input device; and transmitting a second communication comprising second user input data, associated with the second indication, and a second input timing value indicating the second input time relative to the second reference time value.

Aspect 9: The method of any of Aspects 1-8, wherein the first input timing value is embedded within the first user input data.

Aspect 10: The method of any of Aspects 1-9, wherein the first communication comprises a timing value identifier that indicates the first input timing value.

Aspect 11: The method of any of Aspects 1-10, wherein the wireless communication is associated with a wireless area network.

Aspect 12: The method of any of Aspects 1-11, wherein the wireless communication is associated with a personal area network.

Aspect 13: The method of any of Aspects 1-12, wherein the wireless communication is associated with a Wi-Fi network.

Aspect 14: A method for wireless communication performable at a wireless access point, comprising: transmitting a first beacon signal indicating a first reference time value, wherein the wireless access point is associated with a gaming console; receiving, from a first wireless communication device associated with a first user input device, a first communication comprising first user input data, associated with a first indication of a first user input to the first user input device, and a first input timing value indicating a first input time, associated with the first user input, relative to the first reference time value; and receiving, from a second wireless communication device associated with a second user input device, a second communication comprising second user input data, associated with a second indication of a second user input to the second user input device, and a second input timing value indicating a second input time, associated with the second user input, relative to the first reference time value.

Aspect 15: The method of Aspect 14, wherein the first reference time value is associated with a timing synchronization function (TSF) associated with the wireless access point.

Aspect 16: The method of either of claim 14 or 15, wherein the first reference time value comprises an absolute time value.

Aspect 17: The method of either of claim 14 or 15, wherein the first reference time value comprises a relative time value associated with a prior reference time value.

Aspect 18: The method of any of Aspects 14-17, wherein the first reference time value comprises a relative time value associated with an absolute time value.

Aspect 19: The method of any of Aspects 14-18, wherein the first user input device comprises a first game controller and the second user input device comprises a second game controller.

Aspect 20: The method of any of Aspects 14-19, further comprising: transmitting a second beacon signal indicating a second reference time value; and receiving a third communication comprising third user input data, associated with a third user input to the first user input device, and a third input timing value indicating a third input time relative to the second reference time value.

Aspect 21: The method of any of Aspects 14-20, further comprising assigning, in association with the first input timing value and the second input timing value, a user input timing order associated with the first user input data and the second user input data.

Aspect 22: The method of Aspect 21, wherein the first input timing value is equal to the second input timing value, and wherein assigning the user input timing order comprises assigning the user input timing order in association with a tie-breaking scheme.

Aspect 23: The method of Aspect 22, wherein the tie-breaking scheme is associated with a pseudo random number generator, and wherein assigning the user input timing order comprises: generating, in association with the pseudo random number generator, a first pseudo random value associated with the first user input data; generating, in association with the pseudo random number generator, a second pseudo random value associated with the second user input data; and assigning the user input timing order in association with the first pseudo random number value and the second pseudo random number value.

Aspect 24: The method of Aspect 22, wherein the first input timing value is equal to the second input timing value, and wherein the tie-breaking scheme comprises a round-robin scheme.

Aspect 25: The method of any of Aspects 21-24, further comprising assigning, based on the user input timing order, a merit status to one of the first user input device or the second user input device.

Aspect 26: The method of Aspect 25, wherein the merit status comprises an indication of a winner of a game associated with the gaming console.

Aspect 27: The method of any of Aspects 14-26, wherein the first input timing value is embedded within the first user input data.

Aspect 28: The method of any of Aspects 14-27, wherein the first communication comprises a timing value identifier that indicates the first input timing value.

Aspect 29: The method of any of Aspects 14-28, wherein the wireless communication is associated with a wireless area network.

Aspect 30: The method of any of Aspects 14-29, wherein the wireless communication is associated with a personal area network.

Aspect 31: The method of any of Aspects 14-30, wherein the wireless communication is associated with a Wi-Fi network.

Aspect 32: An apparatus for wireless communication at a device, comprising a processor; memory coupled with the processor; and instructions stored in the memory and executable by the processor to cause the apparatus to perform the method of one or more of Aspects 1-13.

Aspect 33: A device for wireless communication, comprising a memory and one or more processors coupled to the memory, the one or more processors configured to perform the method of one or more of Aspects 1-13.

Aspect 34: An apparatus for wireless communication, comprising at least one means for performing the method of one or more of Aspects 1-13.

Aspect 35: A non-transitory computer-readable medium storing code for wireless communication, the code comprising instructions executable by a processor to perform the method of one or more of Aspects 1-13.

Aspect 36: A non-transitory computer-readable medium storing a set of instructions for wireless communication, the set of instructions comprising one or more instructions that, when executed by one or more processors of a device, cause the device to perform the method of one or more of Aspects 1-13.

Aspect 37: An apparatus for wireless communication at a device, comprising a processor; memory coupled with the processor; and instructions stored in the memory and executable by the processor to cause the apparatus to perform the method of one or more of Aspects 14-31.

Aspect 38: A device for wireless communication, comprising a memory and one or more processors coupled to the memory, the one or more processors configured to perform the method of one or more of Aspects 14-31.

Aspect 39: An apparatus for wireless communication, comprising at least one means for performing the method of one or more of Aspects 14-31.

Aspect 40: A non-transitory computer-readable medium storing code for wireless communication, the code comprising instructions executable by a processor to perform the method of one or more of Aspects 14-31.

Aspect 41: A non-transitory computer-readable medium storing a set of instructions for wireless communication, the set of instructions comprising one or more instructions that, when executed by one or more processors of a device, cause the device to perform the method of one or more of Aspects 14-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:

one or more memories; and one or more processors, coupled to the one or more memories, configured to cause the wireless communication device to:

receive a first beacon signal associated with a wireless access point, the first beacon signal indicating a first reference time value;

obtain, associated with a first input time, a first indication of a first user input to a user input device, wherein the wireless communication device is associated with the user input device; and transmit a first communication comprising first user input data, associated with the first indication, and a first input timing value indicating the first input time relative to the first reference time value, wherein the first input timing value is embedded within the first user input data.

2. The wireless communication device of claim 1, wherein the first reference time value is associated with a timing synchronization function (TSF) associated with the wireless access point.

3. The wireless communication device of claim 1, wherein the first reference time value comprises an absolute time value.

4. The wireless communication device of claim 1, wherein the first reference time value comprises a relative time value associated with a prior reference time value.

5. The wireless communication device of claim 1, wherein the first reference time value comprises a relative time value associated with an absolute time value.

6. The wireless communication device of claim 1, wherein the user input device comprises a game controller, a wearable device, or an Internet of Things (IoT) device.

7. The wireless communication device of claim 1, wherein the one or more processors are further configured to cause the wireless communication device to:

obtain, associated with a second input time, a second indication of a second user input to the user input device; and transmit a second communication comprising second user input data, associated with the second indication, and a second input timing value indicating the second input time relative to the first reference time value.

8. The wireless communication device of claim 1, wherein the one or more processors are further configured to cause the wireless communication device to:

receive a second beacon signal indicating a second reference time value;

obtain, at a second input time, a second indication of a second user input to the user input device; and transmit a second communication comprising second user input data, associated with the second indication, and a second input timing value indicating the second input time relative to the second reference time value.

9. The wireless communication device of claim 1, wherein the first communication comprises a timing value identifier that indicates the first input timing value.

10. The wireless communication device of claim 1, wherein the wireless communication is associated with a wireless area network.

11. The wireless communication device of claim 1, wherein the wireless communication is associated with a personal area network.

12. The wireless communication device of claim 1, wherein the wireless communication is associated with a Wi-Fi network.

13. The wireless communication device of claim 1, wherein the wireless access point is associated with a gaming console or an extended reality (XR) device.

14. A wireless access point for wireless communication, comprising:

one or more memories; and one or more processors, coupled to the one or more memories, configured to cause the wireless access point to:

transmit a first beacon signal indicating a first reference time value, wherein the wireless access point is associated with a gaming console;

receive, from a first wireless communication device associated with a first user input device, a first communication comprising first user input data, associated with a first indication of a first user input to the first user input device, and a first input timing value indicating a first input time, associated with the first user input, relative to the first reference time value;

receive, from a second wireless communication device associated with a second user input device, a second communication comprising second user input data, associated with a second indication of a second user input to the second user input device, and a second input timing value indicating a second input time, associated with the second user input, relative to the first reference time value; and assign, in association with the first input timing value, the second input timing value, and a tie-breaking scheme, a user input timing order associated with the first user input data and the second user input data, wherein the first input timing value is equal to the second input timing value.

15. The wireless access point of claim 14, wherein the first reference time value is associated with a timing synchronization function (TSF) associated with the wireless access point.

16. The wireless access point of claim 14, wherein the first reference time value comprises a relative time value associated with a prior reference time value.

17. The wireless access point of claim 14, wherein the first reference time value comprises a relative time value associated with an absolute time value.

18. The wireless access point of claim 14, wherein the first user input device and the second user input device comprises a respective game controller, wearable device, or an Internet of Things (IoT) device.

19. The wireless access point of claim 14, wherein the one or more processors are further configured to cause the wireless access point to:

transmit a second beacon signal indicating a second reference time value; and receive a third communication comprising third user input data, associated with a third user input to the first user input device, and a third input timing value indicating a third input time relative to the second reference time value.

20. The wireless access point of claim 14, wherein the tie-breaking scheme is associated with a pseudo random number generator, and wherein the one or more processors, to cause the wireless access point to assign the user input timing order, are configured to cause the wireless access point to:

generate, in association with the pseudo random number generator, a first pseudo random number value associated with the first user input data;

generate, in association with the pseudo random number generator, a second pseudo random number value associated with the second user input data; and assign the user input timing order in association with the first pseudo random number value and the second pseudo random number value.

21. The wireless access point of claim 14, wherein the first input timing value is equal to the second input timing value, and wherein the tie-breaking scheme comprises a round-robin scheme.

22. The wireless access point of claim 14, wherein the one or more processors are further configured to cause the wireless access point to assign, based on the user input timing order, a merit status to one of the first user input device or the second user input device.

23. The wireless access point of claim 22, wherein the merit status comprises an indication of a winner of a game associated with the gaming console.

24. The wireless access point of claim 14, wherein the wireless communication is associated with a Wi-Fi network.

25. A method for wireless communication performable at a wireless communication device, comprising:

receiving a first beacon signal associated with a wireless access point, the first beacon signal indicating a first reference time value;

obtaining, associated with a first input time, a first indication of a first user input to a user input device, wherein the wireless communication device is associated with the user input device; and transmitting a first communication comprising first user input data, associated with the first indication, and a first input timing value indicating the first input time relative to the first reference time value, wherein the first input timing value is embedded within the first user input data.

26. The method of claim 25, wherein the first reference time value is associated with a timing synchronization function (TSF) associated with the wireless access point.

27. The method of claim 25, wherein the wireless access point is associated with a gaming console or an extended reality (XR) device.

28. A method for wireless communication performable at a wireless access point, comprising:

transmitting a first beacon signal indicating a first reference time value, wherein the wireless access point is associated with a gaming console;

receiving, from a first wireless communication device associated with a first user input device, a first communication comprising first user input data, associated with a first indication of a first user input to the first user input device, and a first input timing value indicating a first input time, associated with the first user input, relative to the first reference time value;

receiving, from a second wireless communication device associated with a second user input device, a second communication comprising second user input data, associated with a second indication of a second user input to the second user input device, and a second input timing value indicating a second input time, associated with the second user input, relative to the first reference time value; and assigning, in association with the first input timing value, the second input timing value, and a tie-breaking scheme, a user input timing order associated with the first user input data and the second user input data, wherein the first input timing value is equal to the second input timing value.

29. The method of claim 28, further comprising assigning, in association with the first input timing value and the second input timing value, a user input timing order associated with the first user input data and the second user input data.

30. The method of claim 28, wherein the first reference time value is associated with a timing synchronization function (TSF) associated with the wireless access point.

* * * * *